(12) United States Patent
Hemsath et al.

(10) Patent No.: US 7,752,661 B2
(45) Date of Patent: *Jul. 6, 2010

(54) METHOD AND SYSTEM FOR SERVER SUPPORT OF PLUGGABLE AUTHORIZATION SYSTEMS

(75) Inventors: David Kurt Hemsath, Round Rock, TX (US); Donna E. Skibbie, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/930,509

(22) Filed: Oct. 31, 2007

(65) Prior Publication Data

US 2008/0052762 A1    Feb. 28, 2008

Related U.S. Application Data

(63) Continuation of application No. 09/814,808, filed on Mar. 21, 2001, now Pat. No. 7,320,141.

(51) Int. Cl.
*H04L 9/32* (2006.01)

(52) U.S. Cl. .................. 726/21; 726/4; 726/17

(58) Field of Classification Search ............ 726/4, 726/17, 21
See application file for complete search history.

(56) References Cited

U.S. PATENT DOCUMENTS

| | | | |
|---|---|---|---|
| 5,590,193 A | 12/1996 | Le Roux | 380/4 |
| 5,638,431 A | 6/1997 | Everett et al. | 379/115 |
| 5,640,446 A | 6/1997 | Everett et al. | 379/115 |
| 5,706,286 A | 1/1998 | Reiman et al. | 370/401 |
| 5,774,551 A | 6/1998 | Wu et al. | 380/25 |
| 5,815,657 A | 9/1998 | Williams et al. | 395/186 |
| 5,870,559 A | 2/1999 | Leshem et al. | 395/200.54 |
| 5,958,008 A | 9/1999 | Pogrebisky et al. | 709/223 |
| 5,959,577 A | 9/1999 | Fan et al. | 342/357.13 |
| 5,963,924 A | 10/1999 | Williams et al. | 705/40 |
| 5,999,622 A | 12/1999 | Yasukawa et al. | 380/4 |
| 6,016,484 A | 1/2000 | Williams et al. | 705/39 |
| 6,282,703 B1 | 8/2001 | Meth et al. | 717/163 |
| 6,792,605 B1 | 9/2004 | Roberts et al. | 719/313 |
| 7,320,141 B2 * | 1/2008 | Hemsath et al. | 726/21 |
| 7,333,942 B1 * | 2/2008 | Cowles | 705/26 |
| 2003/0163602 A1 | 8/2003 | Johnson et al. | 709/328 |

OTHER PUBLICATIONS

"BEA Tuxedo: Using BEA Tuxedo Security" May 2000 BEA Systems Inc. http://edocs.bea.com/tuxedo/tux71/pdf/sec.pdf.
"BEA Tuxedo: Programming a BEA Tuxedo Application Using TxRPC" May 2000 BEA Systems Inc. http://edocs.bea.com/tuxedo/tux71/pdf/txrpc.pdf.
"Technical Standard Authorization (AZN) API (Document C908)" Jan. 2000 The Open Group.

* cited by examiner

*Primary Examiner*—Kimyen Vu
*Assistant Examiner*—Thomas Gyorfi
(74) *Attorney, Agent, or Firm*—Hamilton & Terrile, LLP; Stephen A. Terrile

(57) ABSTRACT

A method, system, apparatus, and computer program product is presented for plugging in a standard authorization system in a manner such that legacy applications can use the authorization APIs and backend remote interfaces of a legacy authorization system. When a legacy application makes a call intended for a routine within the legacy authorization system, the call is redirected to make the appropriate calls to the APIs of the standard authorization system.

4 Claims, 5 Drawing Sheets

METHOD AND SYSTEM FOR SERVER SUPPORT OF PLUGGABLE AUTHORIZATION SYSTEMS

RELATED APPLICATIONS

This application is a continuation of application Ser. No. 09/814,808, filed on Mar. 21, 2001 now U.S. Pat. No. 7,320, 141, entitled "Method and System for Server Support for Pluggable Authorization Systems" and naming David Kurt Hemsath and Donna E. Skibbie as inventors.

BACKGROUND OF THE INVENTION

1. Technical Field

The present invention relates generally to computer network security and, in particular, to techniques for providing access to secured system resources within the context of an access control framework.

2. Description of the Related Art

Information technology (IT) systems and the Internet have fueled the growth of the current global economy. While IT systems have significant benefits, at the same time they pose potential security threats from unauthorized third parties. Indeed, the lack of security in modern IT systems has emerged as a threat to the integrity of global computer networks. To deal with this problem, IT systems provide a number of known services, such as data authentication, data confidentiality, entity authentication, and authorization. Data authentication typically consists of two sub-services: data integrity and data origin authentication. A data integrity service is used to convince a receiver of given data that the data was not changed during transit. Data origin authentication proves to the receiver the identity of the real sender. Data confidentiality protects against disclosure of data during transmission. Entity authentication provides the system with proof that a certain entity is who they claim to be. Authorization is the act of determining whether an authenticated entity has the right to execute an action. Authorization and authentication thus are related services. To be able to provide authorization, it is necessary to determine who the entity is (e.g., by entity authentication). Authorization, in general, consists of two separate stages: providing privileges (authorization credentials) to a particular entity, and using these privileges in combination with access decision rules at the resource to determine if access should be granted to the entity.

Many servers use an authorization system that has become outdated (such as The Open Group's Distributed Computing Environment, or "DCE") and that does not make use of new authorization technology, such as role-based authorization and entitlements. The authorization system may also be dated because the application must use product-specific authorization APIs to access the authorization system. In contrast, The Open Group has promulgated a technical specification for a standard Authorization (AZN) API, Open Group Technical Standard C908, that can interface with any system or application that adheres to the standard.

New authorization systems are commercially available that make use of new authorization technology and standard authorization APIs. One example is IBM Policy Director. Developers of server applications desire to use such new authorization systems because they allow the server application to take advantage of new authorization technology and to plug in other authorization systems, as needed, that use the same standard authorization APIs. In the past, this has not been practical.

Upgrading a legacy application to the new authorization APIs can be both difficult and expensive. An effective solution requires extensive re-coding and testing of the legacy application, which is costly and may even be impossible if the required skills for modifying the legacy application are no longer readily available. Therefore, if the administrator of an enterprise needs to keep existing legacy applications, the administrator might not want to upgrade any of the applications to a new authorization system as this would require the administrator to support the databases used by both authorization systems.

For example, assume the administrator maintains an existing server application that is based on the DCE authorization system. This application would require the administrator to keep DCE interfaces on the server (which understands such calls as "dce_acl_is_client_authorized") as well as the database used by the DCE-based authorization system. Now, assume the administrator wants to add a new server application that uses IBM Policy Director as the authorization system. This would require the administrator to maintain Policy Director interfaces as well as DCE interfaces to the server because both the calls to the standard authorization APIs and the DCE-based authorization system would need to be understood. Also, this would require the administrator to maintain the authorization databases required by both authorization systems.

Therefore, it would be advantageous to provide a methodology for plugging in a new authorization system without any changes to legacy applications.

BRIEF SUMMARY OF THE INVENTION

A method, system, apparatus, and computer program product is presented for plugging in a new authorization system in a manner such that legacy applications can use the authorization APIs and backend remote interfaces of a legacy authorization system. When a legacy application makes a call intended for a routine within the legacy authorization system, the call is redirected to make the appropriate calls to the APIs of the newly deployed authorization system.

For example, in a legacy DCE authorization system, an administrator can configure access control lists (ACLs) on objects by using a management application that uses the DCE APIs, which call backend routines that are defined in a DCE remote ACL (rdacl) interface. After the ACLs have been configured, a DCE-based server application can determine a client's permission by calling a DCE API (e.g., an API named dce-acl-is-client-authorized).

This legacy authorization model can be upgraded to allow new authorization systems to be plugged into the computational environment by deploying a new set of remote ACL backend routines and a new DCE API. If the server is configured to use the new authorization system, the remote ACL routines and the new DCE API would call the required APIs in the new authorization system.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other Is objects and a fuller understanding of the invention may be had by referring to the following Detailed Description of the Preferred Embodiment.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE PREFERRED EMBODIMENT

Figure 1A:
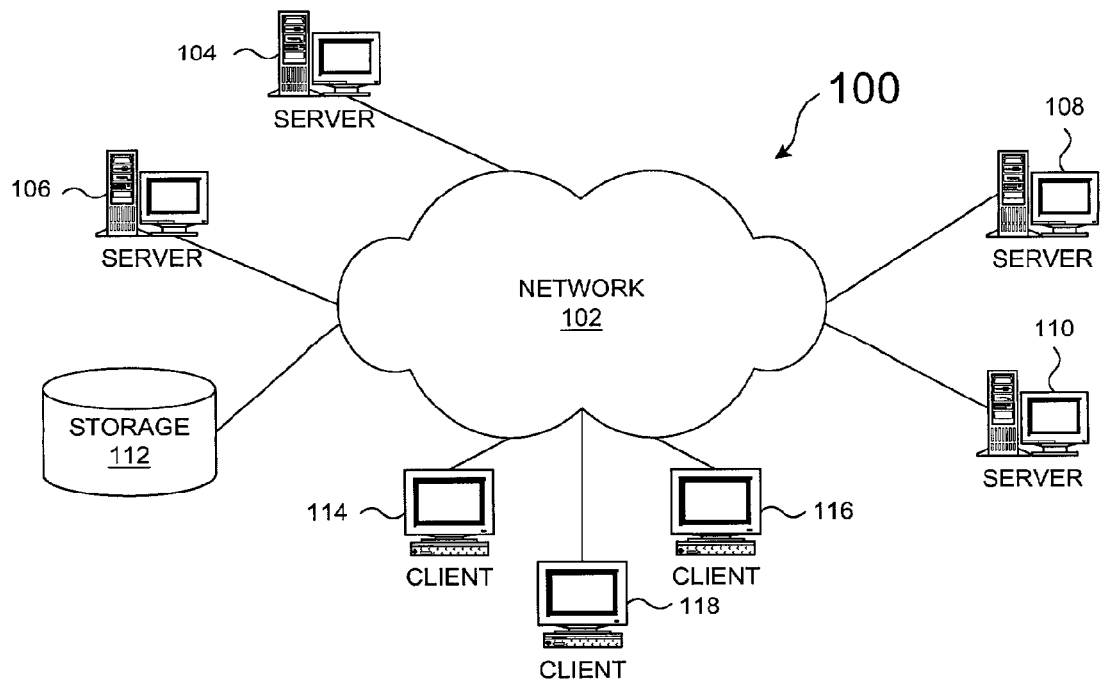
FIG. 1 is a block diagram of a known access control methodology.

With reference now to the figures, FIG. 1A depicts a typical network of data processing systems. Distributed data processing system 100 contains network 102, which is a medium that may be used to provide communications links between various devices and computers connected together within distributed data processing system 100. Network 102 may include permanent connections, such as wire or fiber optic cables, or temporary connections made through telephone or wireless communications. For example network 102 may include the Internet. In the depicted example, servers 104-110 are connected to network 102 along with storage unit 112. In addition, clients 114-118 also are connected to network 102.

The present invention could be implemented on a variety of hardware platforms; FIG. 1A is intended as an example of a heterogeneous computing environment and not as an architectural limitation for the present invention. Data processing systems connected to the network may be represented by a variety of computing devices, such as mainframes, personal computers, personal digital assistants (PDAs), etc. Distributed data processing system 100 may include additional servers, clients, routers, and other devices that are not shown.

Figure 1B:
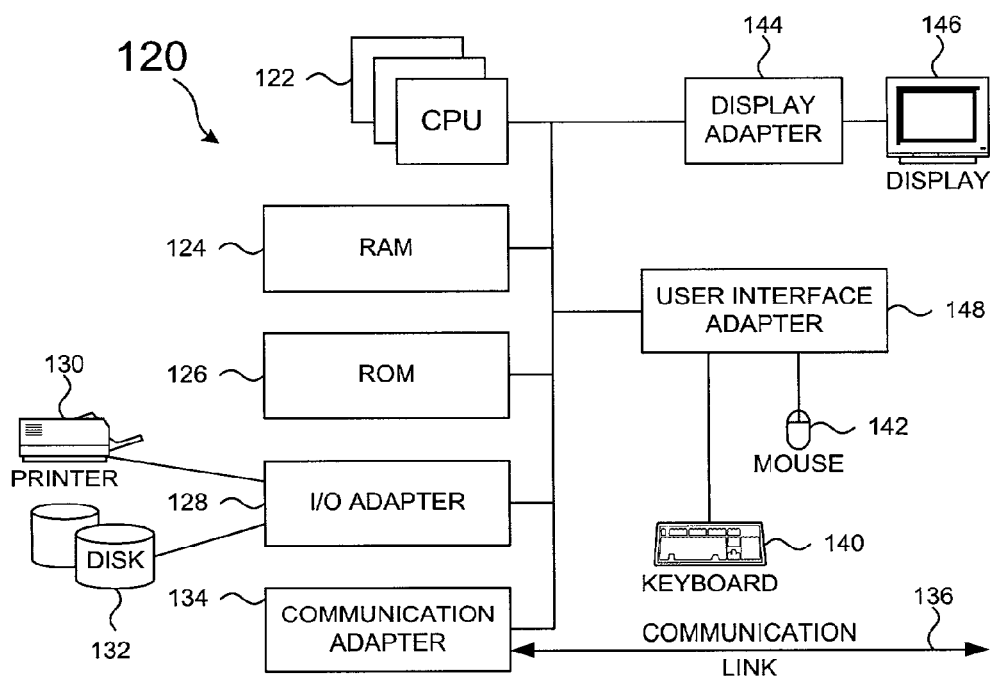

With reference now to FIG. 1B, a diagram depicts a typical computer architecture of a data processing system, such as those shown in FIG. 1A. Data processing system 120 contains one or more central processing units (CPUs) 122 connected to internal system bus 123, which interconnects random access memory (RAM) 124, read-only memory (ROM) 126, and input/output adapter 128, which supports various I/O devices, such as printer 130, disk units 132, or other devices not shown, such as a sound system, etc. System bus 123 also connects communication adapter 134 that provides access to communication link 136. User interface adapter 148 connects various user devices, such as keyboard 140 and mouse 142, or other devices not shown, such as a stylus, microphone, etc. Display adapter 144 connects system bus 123 to display device 146.

Those of ordinary skill in the art will appreciate that the hardware in FIG. 1B may vary depending on the system implementation. For example, the system may have one or more processors and multiple types of non-volatile memory. Other peripheral devices may be used in addition to or in place of the hardware depicted in FIG. 1B. In other words, one of ordinary skill in the art would not expect to find similar components or architectures within a network-enabled phone and a desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unit® operating system, while another device contains a Microsoft® Windows® operating system environment.

The present invention may be implemented on a variety of hardware and software platforms, as described above. More specifically, though, the present invention is directed to providing an authorization framework for use with legacy applications and pluggable authorization systems. As background, a known, standard, authorization system and a typical, legacy, authorization framework are presented before describing the present invention in more detail.

Figure 1C:
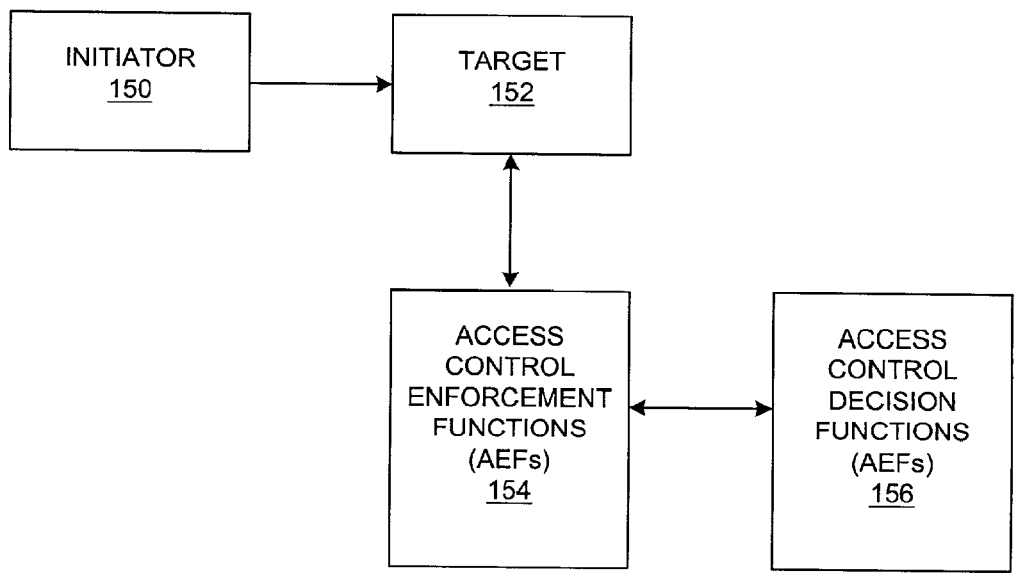

With reference now to FIG. 1C, a block diagram illustrates a known access control methodology. As is well-known, access control concerns the prevention of unauthorized use of a resource, including the prevention of use of a resource in an unauthorized manner. A standard access control framework that provides authorization functionality has been defined in the ISO 10181-3 Standard, entitled "Access Control Framework" (International Organization for Standardization, Information Retrieval, Transfer and Management for OSI: Access Control Framework, ISO/IEC JTC 1/SC 21/WG 1 N6947 Second CD 10181-3, May 1992).

FIG. 1C shows the four, basic, defined roles for components participating in an access request within the ISO 10181-3 access control framework: initiators 150, targets 152, access control enforcement functions (AEFs) 154, and access control decision functions (ADFs) 156. Initiators 150 submit access requests to obtain access to a controlled or protected resource. An initiator is an entity, e.g., a human user or computer-based entity, that attempts to access other entities. An access request, which includes the operations and operands that form part of an attempted access, specifies an operation to be performed on target 152, which is any entity to which access may be attempted. An operation is any action that an initiator's access request asks to have performed on a protected resource. Access control enforcement functions 154 mediate access requests. In particular, an AEF 154 submits decision requests to access control decision functions 156. Thus, a decision request is the message which AEF 154 sends to ADF 156 to ask the ADF whether a particular access request should be granted or denied. ADF 156 decides whether access requests should be granted or denied to a protected or secured resource. A resource may be an application, data, software component, hardware component, system, or other software or hardware item of computational value within a data processing system.

In an access control framework such as the one described above, authentication refers to the process of verifying an identity claimed by or for a system entity. Authorization refers to the granting of access rights to a subject, e.g., a user, or program, or the like. Whether or not a particular initiator has access rights is typically determined by one or more so-called privilege attributes. A privilege attribute is an attribute associated with an initiator that, when matched against control attributes of a protected resource, is used to grant or deny access to that protected resource. A representative privilege attribute is a group membership, a role clearance, or the like.

Figure 2:
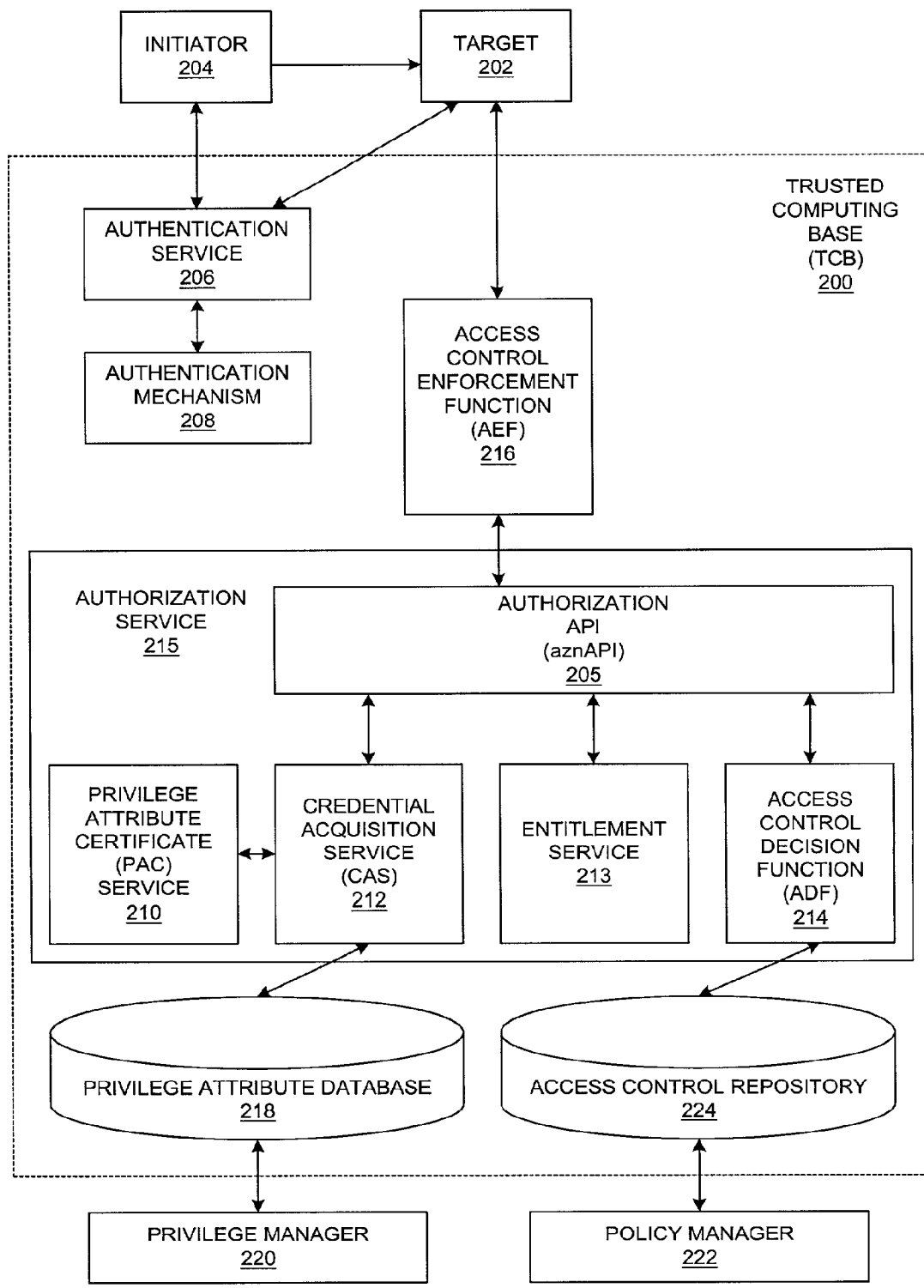
FIG. 2 is a block diagram of a known, standard, authorization architecture.

With reference now to FIG. 2, a block diagram depicts a known, standard, authorization architecture. As described in more detail below, the present invention allows a legacy application to make use of a standard authorization authority without making any changes to the legacy application. FIG. 2 depicts an authorization service that is compliant with Open Group Technical Standard C908 for an Authorization (AZN) API, which itself is compliant with ISO 10181-3.

In FIG. 2, an authorization service operates within an authorization or "trust" domain in a trusted computing base (TCB) 200. The authorization authority is used to prevent an unauthorized use of a protected resource, such as target 202, including the prevention of an unauthorized use of the resource by an entity that may have other authorized uses for target 202. An initiator 204, which is a human or computer-based entity, desires to access target 202. The authorization authority comprises an access control (i.e. authorization or "azn") application programming interface 205, which serves to separate authentication service 206 (and its associated authentication mechanism 208) from authorization services provided by privilege attribute certificate (PAC) service 210, credential acquisition service (CAS) 212, entitlement service 213, and a given access control decision function (ADF) 214. Together, authorization API 205, CAS 212, PAC service 210, entitlement service 213, and ADF 214 comprise authorization service 215.

Authentication service 206 and authentication mechanism 208 need not be part of the authorization authority. In an illustrative embodiment, authentication service 206 performs Kerberos authentication, public key authentication, or any other known authentication technique to return a token or other data structure representing a user identification. The particular type of authentication is not part of the present invention.

ADF 214 is a specialized function that makes access control decisions by applying access control policy rules to an access request based on given information. Access control policy rules are stored in access control policy repository 224. CAS 212 uses information about the initiator authenticated by the authentication service 206 to look up an initiator's privilege attributes in privilege attributes repository or database 218.

A privilege attribute is an attribute associated with an initiator that, when matched against control attributes of a protected resource, is used to grant or deny access to that protected resource. A credential is an internal structure maintained by authorization API 205 that contains an internal representation of an initiator's privilege attributes. An external representation of the initiator's privilege attributes is a privilege attribute certificate or "PAC". Thus, a PAC is a data structure containing privilege attributes that may be signed by the authority that generated it; PACs are created when necessary by PAC service 210.

Privilege attributes may be set up and managed by an enterprise administrator using privilege manager 220, which is an interface that enables the administrator to define an organization's view of the authorization attributes assigned to given user identities. Access control policy rules may be set up and managed by an enterprise administrator using policy manager 222, which is an interface that enables the administrator to create ADF 214 and to define and manage the organization's authorization policy. These access policies are stored in access control policy repository 224. Each of the managers 220 and 222 comprises a computer interface having appropriate display menus and controls to facilitate the definition and management of the attribute or policy data.

When necessary, authorization service 215 is consulted by access control enforcement function (AEF) 216. AEF 216 is a specialized function that is part of the access path between initiator 204 and target 202 on a given access control request. In a manner similar to that described with respect to FIG. 1C, AEF 216 enforces the decision made by ADF 214.

The components illustrated in FIG. 2 preferably have the following trust relationships. The owner of target resource 202 trusts AEF 216, and it implicitly trusts the authentication and authorization services within trusted computing base 200 to prevent unauthorized initiators from accessing the target. Authentication service 206 trusts its authentication mechanism 208 to function correctly and provide a correct identity for initiator 204. AEF 216 trusts authentication service 206 (and thereby implicitly trusts its authentication mechanism 208) to provide a correct, authenticated identity for initiator 204.

Authorization API 205 trusts AEF 216 to provide correct access control information or "ACI", which is any information used for access control purposes, including contextual information. Reciprocally, AEF 216 trusts the API 205, and implicitly the authorization service 215, to make and return correct access decisions and to return correct PACs and privilege attributes. Authorization API 205 further trusts its CAS (and the underlying privilege attribute repository 218) to translate initiator identities to credentials correctly. Authorization API 205 also trusts PAC service 210 to generate PACs from credentials correctly, and to return a credential's privilege attributes correctly. Authorization API 205 and PAC service 210 trust the privilege attribute repository 218 to contain correct information. In addition, authorization API 205 trusts the authorization service's ADF 214 (and the underlying access control policy repository 224) to make correct access decisions.

As an example of some of the functions that may be implemented within an authorization service, the following table lists the families of functions provided by a standard authorization API and briefly describes what each family of functions does.

TABLE 1 aznAPI Functions

| Interface-family name prefix | Interface-family supported function |
| --- | --- |
| azn_initialize, azn_shutdown | Initialize aznAPI implementation; clean up aznAPI implementation in preparation for shutdown. |
| azn_creds | Create, delete, modify, and combine credentials; get information from credentials; build PAC based on credential. |
| azn_id | Build credential based on authenticated identity produced by an authentication service. |
| azn_decision | Make an access decision. |
| azn_entitlement | Get access control policy information. |

TABLE 1-continued aznAPI Functions

| Interface-family name prefix | Interface-family supported function |
| --- | --- |
| azn_pac | Build credential based on PAC produced by an authorization service. |
| azn_error | Retrieve error information from status values returned by aznAPI functions. |
| azn_authority | Discover authentication, authorization, and credentials; label and PAC mechanisms supported by aznAPI implementation. |
| azn_attrlist | Create and delete attribute/value pair list; write parameter data into attribute/value pair list; read parameter data from attribute/value pair list. |
| azn_release | Release data allocated by aznAPI implementation. |

Figure 3:
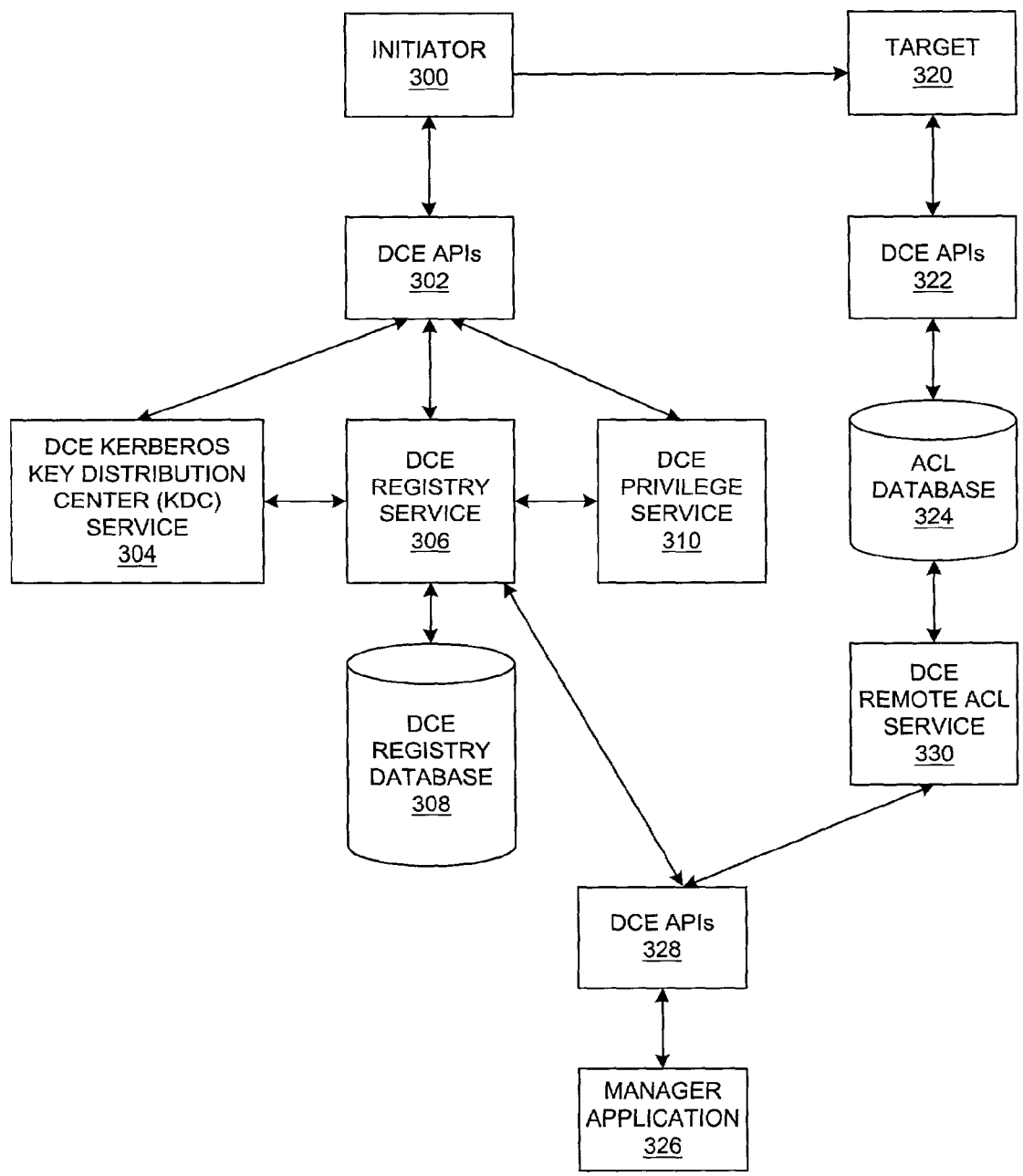
FIG. 3 is a block diagram a known, legacy authorization system.

With reference now to FIG. 3, a block diagram depicts a known, legacy authorization system. In this example, the legacy authorization system is a DCE authorization system that authorizes access to a target for an initiator in the following manner. It should be noted, however, that other authorization systems could be used as an example of a legacy authorization system. For example, the Microsoft® Windows® 2000 operating system performs authorization services in a manner similar to the DCE authorization services.

Initiator 300 calls DCE login API 302. In response, the DCE login API performs three steps. As a first step, using the DCE authentication system, the DCE login API calls a remote routine of DCE Kerberos Key Distribution Center (KDC) service 304 to obtain Kerberos authentication credentials for the initiator.

The DCE login API then uses the DCE authorization system for the remaining two of the three steps. In the second step, the DCE login API calls the remote "rs_login_get_info" routine of DCE registry service 306 to obtain privilege attributes of the initiator. DCE registry service 306 obtains the privilege attributes from DCE registry database 308.

In the third step, the DCE login API calls the remote "rpriv_get_eptgt" routine of DCE privilege service 310 to verify the privilege attributes of the initiator and to seal these attributes in a DCE PAC structure, which can optionally be embedded in an DCE EPAC (extended privilege attribute certificate) structure. (In this example, the PAC is embedded in an EPAC structure, although the example would work if the PAC is not embedded in an EPAC structure.) DCE privilege service 310 does this by performing three steps. The first step is to obtain its own Kerberos authentication credentials from DCE Kerberos KDC authentication service 304. The second step is to verify privilege attributes using DCE registry service 306. The third step is to seal the privilege attributes in a DCE PAC, embed the DCE PAC in a DCE EPAC structure, and return the DCE EPAC (which contains the privilege attributes of the initiator) and the Kerberos authentication credentials (which are the authentication credentials of DCE privilege service 306) to DCE login API 302. The DCE login API returns this information to the initiator.

Initiator 300 then makes a request to target 320 to access a protected resource and, with this request, initiator 300 passes the Kerberos authentication credentials of the DCE privilege service and the DCE EPAC of the initiator. In this example, the initiator makes the request using the DCE RPC (Remote Procedure Call) protocol. As is well known, a distributed application based on the client/server model consists of two parts: the client side of the application, which runs on one machine and makes a request for service on behalf of a user, and the server side of the application, which runs on another machine on the network and fulfills the service request. The two pieces of code on two different machines need to be able to communicate across the network. One model for implementing communications between the client and server of an application is the remote procedure call (RPC). In RPC, as in a traditional local procedure call, control is passed from one code segment to another, and then returns to the original segment. However, in a remote procedure call, the called procedure runs in a different address space, usually on a different machine than the calling procedure, and arguments and return values must be packed up into messages and sent over the network. The underlying RPC mechanism makes this look like a procedure call to the programmer, and the RPC facility shields the application programmer from the details of network communications between client and server nodes.

Target 320 first authenticates the Kerberos authentication credentials of the DCE privilege service. In this example, target 320 does this using the DCE RPC protocol.

After authentication, target 320 determines which resource the initiator wants to access, the permissions required by the initiator, and whether the initiator is authorized to perform the requested access. To do this, the target performs four steps. The first step is to get the RPC structure returned by the DCE RPC protocol. The second step is to extract from the request the name of the desired resource and map this to two DCE universal unique identifiers (UUIDs): the UUID of the access control list (ACL) that has been configured for the resource and the UUID of the ACL manager that controls access to this resource. The third step is to extract from the request the desired permissions and map them to a DCE permission set. The fourth step is to call the "dce_acl_is_client_authorized" API to determine whether the client is authorized to perform the desired request, passing in the RPC structure ACL UUID, ACL manager UUID, and desired permissions.

The DCE "dce_acl_is_client_authorized" API performs six steps using various APIs within DCE APIs 322. The first step is to call a DCE RPC API, passing in the RPC structure, in order to determine whether the authentication credentials received from the initiator are valid. The second step is to call a DCE credentials API, passing in the RPC structure, to get the DCE PAC of the initiator. The third step is to get the initiator's permission set by comparing the initiator's desired permissions with the DCE PAC. The fourth step is to use the ACL manager UUID and ACL UUID to find the ACL for the desired resource and get the permission set configured in this ACL. The fifth step is to compare the initiator's permission set with the permission set configured in the ACL and, by doing so, determine if the initiator is authorized. The final step is to return to the target a value of YES or NO indicating whether the initiator is authorized.

In a manner similar to managers 220 and 222 in FIG. 2, one or more manager applications 326 use DCE APIs 328 to configure information within the appropriate databases. The DCE authorization system depends on two databases: DCE registry database 308, in which the privilege attributes for each user are configured; and DCE ACL database 324, in which DCE ACLs for each resource are configured. To configure DCE registry database 308, a manager application calls the DCE registry APIs, which call remote interfaces of the DCE registry service. To configure DCE ACL database 324, a manager calls the DCE ACL APIs, which call remote interfaces of DCE remote ACL service 330.

FIG. 3 shows a legacy authorization system that may be used by legacy applications, and FIG. 2 shows a standard authorization system that may be used by a variety of updated, non-legacy applications. In contrast to these approaches, the present invention is directed toward re-routing authorization requests intended for a legacy authorization system to a standard authorization system.

In the example of a DCE legacy authorization system in FIG. 3, all authorization processing made on behalf of the initiator is done by DCE remote routines. By recognizing that the remote procedure calls in a legacy authorization system can be intercepted, the present invention intercepts calls to remote routines and substitutes different functionality for the remote routines.

In the example of a standard authorization system in FIG. 2, all authorization processing made on behalf of the initiator is done via an authorization API that presents a standard interface for calling authorization functions; the standard authorization API provides a standard interface to potentially different implementations of the authorization functions made available by a variety of commercially available, pluggable, authorization systems. By using the observation of the ability to re-route the remote calls of the legacy authorization system with the standard authorization API that can be used with pluggable authorization systems, the present invention provides a methodology of routing the intercepted calls to the remote routines of the legacy authorization system through the standard authorization API to a variety of pluggable authorization systems. In other words, the present invention provides a methodology for maintaining legacy applications while using those legacy applications with a variety of pluggable authorization systems without expensive, extensive recoding of the legacy applications.

Figure 6:
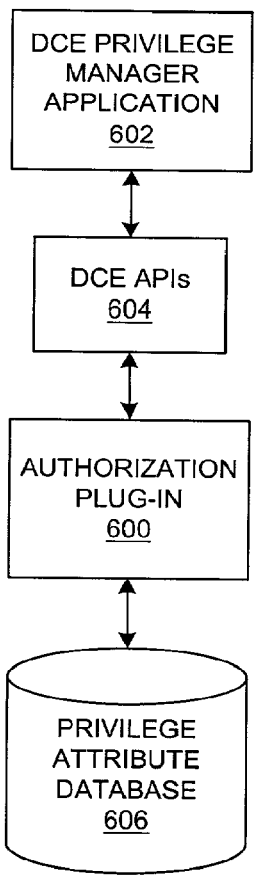
FIGS. 6 and 7 are block diagrams illustrating how an authorization plug-in could be used to intercept and process requests made by manager applications.
Figure 7:
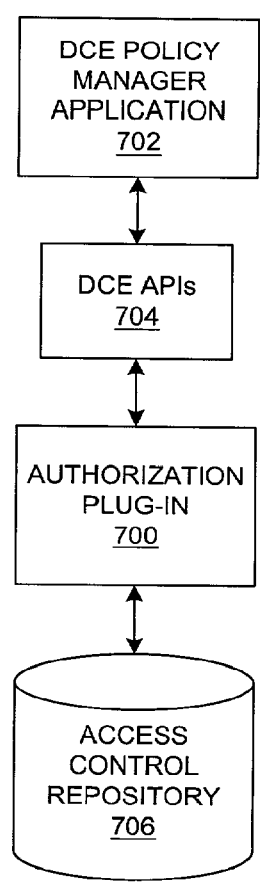
Figure 4:
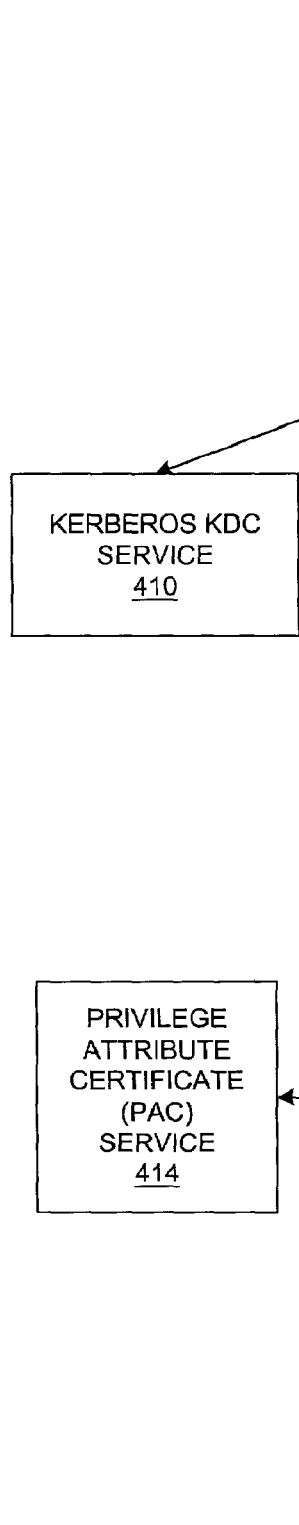
FIG. 4 is a block diagram illustrating how an authorization plug-in could be used to intercept and process authorization requests made on behalf of an initiator in accordance with a preferred embodiment of the present invention.
Figure 5:
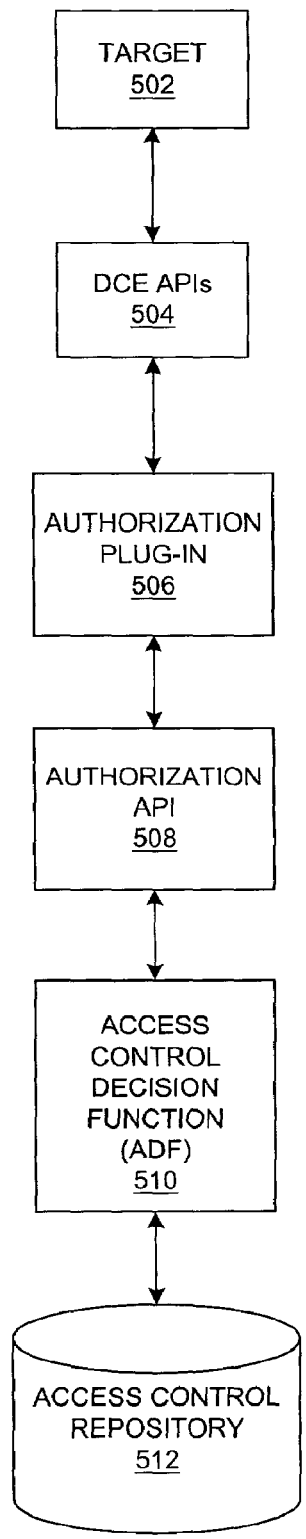
FIG. 5 is a block diagram illustrating how an authorization plug-in could be used to intercept and process authorization requests made by a target in accordance with a preferred embodiment of the present invention.

With reference now to FIGS. 4-7, a set of block diagrams illustrate a method for re-directing the calls to remote routines in a legacy authorization system to the standard authorization system through the use of an authorization plug-in in accordance with a preferred embodiment of the present invention. In particular, FIG. 4 shows how an authorization plug-in could be used to intercept and process authorization requests made on behalf of an initiator, such as the initiator shown in FIG. 3. FIG. 5 illustrates a methodology by which all authorization processing made on behalf of the target could also be re-routed through the authorization plug-in. FIGS. 6-7 depict the manner in which management applications would be changed to work within the preferred embodiment.

Referring to FIG. 4, authorization plug-in 400 may be installed on a standard authorization server. Using the well-known technique of exporting remote routine RPC endpoints, authorization plug-in 400 exports remote routine RPC endpoints for the DCE remote registry and privilege services and, by doing so, intercepts and processes all remote routine calls to these two services. Authorization plug-in 400 may be located on an authorization server or anywhere within the distributed computing environment as long as it is able to intercept and process the remote routine calls and can be associated with a standard authorization service.

For example, in a manner similar to that described above with respect to initiator 300 in FIG. 3, initiator 402 calls the DCE login API, which is one of many APIs within DCE APIs 404. In contrast with the process shown in FIG. 3, when the DCE login API calls the "rs_login_get_info" remote routine, authorization plug-in 400 intercepts and processes this routine. The plug-in processes the call by performing two steps.

First, a standard authorization API, i.e. one of the APIs within authorization APIs 406, such as an "azn_creds" API shown above in Table 1, is called to retrieve privilege attributes from privilege attribute database 408 used by the standard authorization system. The second step is to return the privilege attributes to the DCE login API in the format expected by the DCE login API.

When the DCE login API calls the "rpriv_get_epac" remote routine, authorization plug-in 400 intercepts and processes this routine. The plug-in processes this routine as a series of three steps: (1) obtain Kerberos KDC credentials from Kerberos KDC Service 410 while assuming the identity of a DCE privilege service (in this example, the administrator would have configured the plug-in to be able to authenticate in the DCE realm using the identity of a DCE privilege service); (2) call a standard authorization API, such as the "azn_creds" API, to verify the privilege attributes of the initiator and seal them in a standard PAC used by the standard authorization system using CAS 412 and PAC service 414; and (3) return to the DCE login API (in the format expected by the DCE login API) the Kerberos credentials of the DCE privilege service along with the standard PAC (containing the initiator's privilege attributes) embedded in a DCE EPAC structure.

While FIG. 4 depicts a method for processing calls on behalf of the initiator, FIG. 5 depicts a method for processing calls on behalf of the target. Depending on the legacy authorization system, the target application may also make remote procedure calls to remote routines in the legacy authorization system. If so, the calls from the target application to the application programming interfaces of the legacy authorization system may also be redirected by the authorization plug-in through the use of exported RPC endpoints.

In other legacy authorization systems, the calls from the target application to the application programming interfaces of the legacy authorization system may be made directly to code compiled or linked into the target application. In those types of systems, the authorization plug-in may supply functionality in the form of a code library that can be recompiled or linked into a target application when the authorization plug-in is deployed on a standard authorization server.

Referring back to the example of a DCE legacy authorization system in FIG. 3, all authorization processing made on behalf of the target is processed by the DCE "dce_is_client_authorized" API. FIG. 5 illustrates how calls to this API could be re-routed to an API of the same name in the authorization plug-in. In this example, the target application is recompiled with an authorization plug-in library. The authorization plug-in library implements the "dce_acl_is_client_authorized" API. The target application is recompiled in a well-known manner such that the "dce_acl_is_client_authorized" API from the plug-in library is processed rather than the "dce_acl_is_client_authorized" API from the DCE library.

When target 502 calls the DCE "dce_acl_is_client_authorized" API, which is one of many APIs within DCE APIs 504, authorization plug-in 506 receives and processes the call to this API. The plug-in processes the call to the API by performing a series of six steps that parallel the six steps that were similarly described above with respect to FIG. 3 for the processing of the DCE "dce_acl_is_client_authorized" API.

The first two steps use a DCE RPC API to authenticate the Kerberos authentication credentials passed by the initiator, which is the same first step performed by the DCE legacy "dce_acl_is_client_authorized" API. The second step is to get the standard authorization PAC from the DCE EPAC, which is the same second step performed by the DCE legacy "dce_acl_is_client_authorized" API.

The third step is to map the DCE ACL manager UUID to a resource manager recognized by the standard authorization system and to map the DCE ACL UUID to a resource managed by the standard authorization system. The fourth step is to map the DCE permission set to a permission set recognized by the standard authorization system. The fifth step is to use a standard authorization API, i.e. one of the APIs within authorization APIs 508, such as "azn_decision" shown in Table 1, to make an authorization decision based on the PAC, the desired permissions, the resource, and the resource manager, which would also require the use of ADF 510 and access control repository 512. The final step is to return to the target a value of YES or NO indicating the authorization decision, i.e. whether the initiator is authorized.

Referring back to FIG. 3, a privilege manager application configures privilege attributes by making DCE API calls to remote DCE registry routines, which store these attributes in a DCE registry database. Similarly, a policy manager application configures ACL attributes by making DCE API calls to remote DCE ACL routines, which store these attributes in a DCE ACL database. In a manner similar to the re-routing explained with respect to FIGS. 4-5, FIGS. 6-7 are block diagrams that illustrate how the remote DCE registry routines could be re-routed to the standard authorization system by means of an authorization plug-in. For FIGS. 6-7, in a manner similar to that for FIGS. 4-5, the authorization plug-in is installed on a standard authorization system server, although it could be located elsewhere within the distributed computing environment.

Referring to FIG. 6, authorization plug-in 600 exports remote routine RPC endpoints for the DCE registry routines and, by doing so, intercepts and processes any calls from DCE privilege manager application 602 to DCE registry routines within DCE APIs 604 by storing data in privilege attribute database 606 used by the standard authorization system. Referring to FIG. 7, authorization plug-in 700 exports remote routine RPC endpoints for the DCE registry routines and, by doing so, intercepts and processes any calls from DCE policy manager application 702 to DCE registry routines within DCE APIs 704 by storing data in access control repository 706 used by the standard authorization system.

The advantages of the present invention should be apparent in view of the detailed description of the invention that is provided above. A new authorization system can be plugged into a computing environment in a manner such that legacy applications can continue to use the authorization APIs and backend remote interfaces of a legacy authorization system. However, when a legacy application makes a call intended for a routine within the legacy authorization system, the call is redirected to make the appropriate calls to the APIs of the newly deployed authorization system. Since upgrading a legacy application to use the authorization APIs of a newly deployed authorization system can be both difficult and expensive, the present invention avoids extensive re-coding and testing of legacy applications that have been modified to operate in conjunction with a newly deployed authorization system.

In some solutions, an enterprise might decide to maintain a legacy authorization system for diminishing use of a set of legacy applications while simultaneously deploying a new authorization system for new applications. This solution would require a system administrator to maintain different sets of databases for each authorization system. Depending on the changes, additions, and deletions from personnel, computational resources, etc., multiple sets of databases may need to be updated for any given change. With the present invention, only the databases for the newly deployed authorization system need to be maintained. Legacy applications that were designed to operate with a legacy authorization system will draw information from the same databases that are used within the standard authorization system.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product in a computer readable medium executable by a data processing system for authorizing access to a protected resource, the computer program product comprising:

instructions for intercepting a remote procedure call for a remote routine of a Distributed Computing Environment (DCE) authorization service by an authorization plug-in associated with a second authorization service, wherein the authorization plug-in exports remote procedure call endpoints for the remote routines of the DCE authorization service, and wherein the second authorization service supports a standard-compliant authorization application programming interface;

instructions for processing the authorization request in the authorization plug-in by calling application programming interfaces of the second authorization service;

instructions for recompiling or reliniking a target application representing one or more protected resources to include program instructions from the authorization plug-in;

instructions for directing calls within the target application to application programming interfaces of the DCE authorization service to be executed by the program instructions from the authorization plug-in;

instructions for accepting a call in the authorization plug-in to a "dce_acl_is_client_authorized" application programming interface;

instructions for authenticating the authorization credentials passed by the initiator to the target application;

instructions for retrieving the privilege attribute certificate from the DCE EPAC structure;

instructions for mapping a DCE Access Control List (ACL) manager Universally Unique Identifier (UUID) from the DCE EPAC structure to a resource manager in the second authorization service;

instructions for mapping DCE ACL UUID from the DCE EPAC structure to a resource managed by the second authorization service;

instructions for mapping the DCE permission set from the DCE EPAC structure to a permission set of the second authorization service;

instructions for calling an application programming interface of the second authorization service to make an authorization decision based on the permission set of the second authorization service, the privilege attribute certificate, the resource, and the resource manager; and instructions for returning an indication of the authorization decision to the target application.

2. The computer program product of claim 1 further comprising:

instructions for intercepting a call to a DCE "rs_login_get_info" routine;

instructions for retrieving privilege attributes for an initiator from a privilege attribute database in the second authorization service; and instructions for returning the privilege attributes to a DCE application programming interface.

3. The computer program product of claim 2 further comprising:

instructions for intercepting a call to a DCE "rpriv_get_epac" routine;

instructions for obtaining authorization credentials for a DCE privilege service;

instructions for storing the privilege attributes in a privilege attribute certificate;

instructions for embedding the authorization credentials and the privilege attribute certificate in a DCE Extended Privilege Attribute Certificate (EPAC) structure; and instructions for returning the EPAC structure to a DCE application programming interface.

4. The computer program product of claim 1 wherein the standard-compliant authorization application programming interface is The Open Group Technical Standard C908 for an Authorization API.

\* \* \* \* \*